Oct. 11, 1938.    S. B. VON THYSSEN-BORNEMISZA    2,132,865
GRAVITATIONAL INSTRUMENT
Filed Oct. 16, 1935
Fig.1
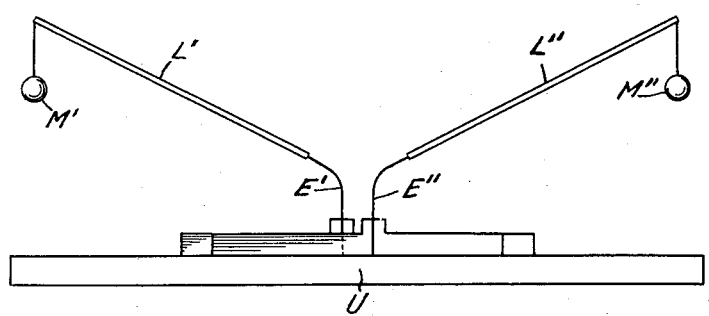
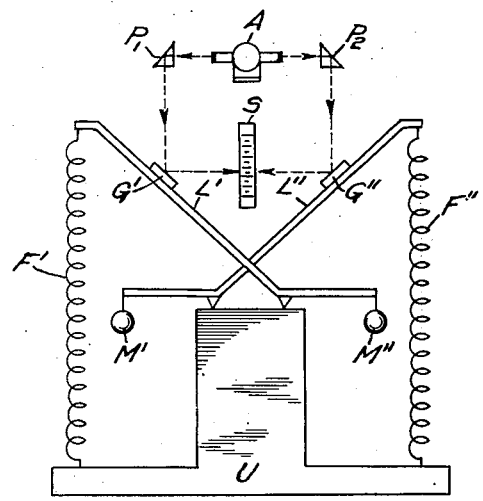
Fig.2
Stephan Baron von Thyssen-Bornemisza
Inventor:
his Atty.

Patented Oct. 11, 1938

2,132,865

UNITED STATES PATENT OFFICE 2,132,865

GRAVITATIONAL INSTRUMENT

Stephan Baron von Thyssen-Bornemisza, The Hague, Netherlands, assignor to Shell Development Company, San Francisco, Calif., a corporation of Delaware Application October 16, 1935, Serial No. 45,189
In Germany October 5, 1934

4 Claims. (Cl. 265—1.4)

The invention relates to a further improvement in the measuring instrument for the determination of variations of the gravitational acceleration forming the subject matter of my copending application Ser. No. 742,878 and as further improved by my further copending application Ser. No. 45,190. Said measuring instrument consists of a lever system comprising a lever connected with a mass and arranged in such a manner that a variation of the gravitational acceleration changes its position, thereby producing an oscillation showing the variation of the gravitational acceleration. According to my prior invention the several parts of the instrument are combined in such a manner that said oscillation is amplified. This may be effected by arranging a spring acting against the movement of the lever system in such a manner that an increase of the gravitational acceleration causes a variation of one of the several lever arms. More particularly said variation produces either an increase of the lever arm of the mass or a shortening of the lever arm upon which the spring is acting.

The instrument according to my prior inventions may be constructed for instance in that way that a mass depends from the one end of an obliquely positioned lever, the other end of which is connected with a blade spring maintaining the lever in an inclined position. A further embodiment consists in a horizontally positioned lever connected in a similar way and provided with means comprising an additional mass within which a slight inclination of the lever produces a variation of the lever arm. A third embodiment consists in a lever system comprising two arms angularly arranged with respect to each other, at the one end of which a coil spring is attached.

Said measuring instruments possess an exceedingly great sensitivity of inclination. Therefore they must be very carefully levelled with the various subsequent measurings taking place at different spots. Thus, it may occur that with a levelling error of one second (angular measure), considering the great sensitivity of inclination, the measuring error may reach 10 millidynes (scientific unit) or more, whereas the necessary accuracy of measuring amounts to one millidyne. Such an accurate levelling cannot be obtained safely and quickly enough with a spirit level or such like. Moreover these levelling devices are extemely sensitive as regards temperature.

The invention therefore relates to an improvement of the instrument by which the accuracy required in the levelling can be considerably reduced. For this purpose the invention consists in a combination of several lever systems of the kind as set forth which are fixed upon a common basis to form a single instrument and consist of two groups each of which possessing a sensitivity of inclination equal to that of the other one and which are combined with each other in such a manner that the variations of inclination are effective upon the two groups in a contrary sense. For said purpose the two groups are arranged so as to form an angle of 180° with each other. The medium figure resulting from both systems, therefore, will contain no error of inclination, and exact values will be obtained by measuring with the combined instrument.

The invention is more clearly illustrated by the accompanying drawing in which

Fig. 1 shows a meter of gravity with an obliquely positioned lever and

Fig. 2 shows a meter of gravity with a lever system comprising two parts arranged angularly to each other.

The lever systems comprise the levers $L'$ and $L''$ respectively arranged on the common basis $U$ and provided with the masses $M'$ and $M''$ respectively. The other end of the lever is connected in Figure 1 with a blade spring $E'$ and $E''$ respectively and in Figure 2 with a spring $F'$ and $F''$ respectively. If the gravitational acceleration is increased the two lever arms take up a more inclined position in the same manner as it has been described in my copending patent applications by an increase of the lever arm in Figure 1 and a decrease of the lever arm in Figure 2.

In both cases the two parts of the measuring instrument are symmetrically constructed. They are rigidly connected to each other or constructed as a single measuring instrument. The levelling is carried out with less than $\frac{1}{10}$ of the hitherto required accuracy. The errors of inclination remaining in consequence thereof are, however, more than compensated by the used arrangement, inasmuch as they have equal height at both parts of the combined instrument, but in the opposite sense. Thus it becomes possible to increase considerably the accuracy and especially to diminish the time taken in measuring.

In order to permit the taking of fast readings, a calibrated scale may be used to indicate movements of the lever arms $L'$ and $L''$. A single scale S may be provided as shown in Fig. 2 of the drawing. The source of light A projects two light beams onto the prisms $P_1$ and $P_2$ which direct the light onto the mirrors G' and G". Each mirror reflects the light beam onto the calibrated scale S to give a reading. The mean or average value of two readings, produced in each instance by the two light beams from the respective mirrors G' and G", gives the true gravitational measurement. It will be obvious that the scale and measuring arrangement described above in connection with Fig. 2 may equally well be applied to the device according to Fig. 1. It should also be clear that a separate calibrated scale may be used with each lever arm or any other conventional measuring arrangement may be employed to facilitate the taking of readings.

Though as a rule it will be feasible to compose the combined instrument of two instruments of similar kind, it will also be possible to combine instruments of a different kind with each other, for instance to use the one partial instrument according to Fig. 1 with a second partial instrument constructed according to Fig. 2 and acting in the opposite sense. Furthermore it would also be possible to effect the compensation by combining more than two, for instance three instruments of a corresponding sensitivity of inclination with each other, acting partially in the one sense and partially in the opposite sense. By arrangements of that kind it is also possible to produce a compensation in the sense of the present invention.

It is to be noted that generally it will not be possible to obtain an absolute equality of the sensitivity of the two systems combined in the apparatus according to the invention. It is, of course, understood that those minor differences of sensitivity between the two contrarily acting systems are also comprised by the terms "equal sensitivity" and "same sensitivity" used in the annexed claims.

What I claim and desire to secure by Letters Patent of the United States is:

1. A gravitation measuring instrument comprising supporting means having a predetermined operating level, a plurality of opposite disposed levers mounted on said support and adapted to take inclined positions with respect thereto, a mass provided on each support subject to gravitational pull, whereby said levers take different angular positions with respect to said support depending upon the gravitational pull, whereby faulty increases or decreases in the measuring values of one lever, due to faulty positioning of the said supporting means outside its said predetermined operating level, are offset by a corresponding decrease or increase in the values given by a lever operating in a plane disposed at an angle with respect to that of said last-mentioned lever, all said levers contributing to one accurate measurement.

2. A gravitation measuring instrument, comprising a base, two spring knee sections, each knee section being rigidly mounted in said base and being under tension and curved to one side of the perpendicular, and a rigid section forming an extension of the outer end of each knee section, each knee section and rigid section forming a lever, the operating planes of each of said levers being disposed at an angle with respect to each other, and a mass provided on each rigid section and subject to gravitational pull to cause relative angular displacements of the knee sections, whereby the centers of gravity of said masses are laterally shifted with respect to the joints of attachment of the respective knee sections to the base, the lateral displacements of the said centers of gravity indicating different gravitational values, inaccuracies in the positioning of said base being off-set by the said pair of levers operating at an angle with respect to each other.

3. The device claimed in claim 1, in which each of said levers constitutes a double-armed lever, a mass being supported by one arm of each of said levers, and spring means secured to the second arm thereof for counterbalancing said mass, whereby displacements of the mass caused by an increase in the gravitational acceleration, diminishes the effective length of the spring-connected lever arm in relation to that of the mass supporting lever arm.

4. The device claimed in claim 1, which comprises two levers each of said two levers constituting a double-armed lever, the latter being pivotally arranged upon said supporting means, a mass being supported by one arm of each of said levers, and spring means secured to the second arm thereof for counterbalancing said mass, whereby displacements of the mass caused by an increase in the gravitational acceleration, diminishes the effective length of the spring-connected lever arm in relation to that of the mass supporting lever arm.

STEPHAN BARON VON THYSSEN-BORNEMISZA.